May 22, 1962     H. M. DAVIDSON     3,035,864
SUN VISOR FOR A MOTOR VEHICLE
Filed May 19, 1960

*INVENTOR.*
HOWARD M. DAVIDSON
BY
Gregory S. Dolgorukov
*ATTORNEYS*

United States Patent Office 3,035,864
Patented May 22, 1962

3,035,864
SUN VISOR FOR A MOTOR VEHICLE
Howard M. Davidson, 1415 Parker, Detroit, Mich.
Filed May 19, 1960, Ser. No. 30,116
6 Claims. (Cl. 296—97)

This invention relates to sun visors for motor vehicles, and more particularly to an improved frame for such visor.

Sun visors have now become standard equipment for motor vehicles. At least one such visor is usually installed in a motor vehicle in front of the operator of the vehicle on a bracket mounted above and to the outside of the occupant. Such visor generally comprises a rod having one of its ends connected to said bracket for swinging thereon and serving as a shaft on which a flat piece of suitable material, such as upholstered cardboard, is adapted to rotate. By swinging the rod in the bracket, the visor can be moved to the front or to the outer side of the operator or occupant, and its free end pinched in one of the two brackets provided at such positions. By turning the visor on the rod, it can be adjusted at a desired angle to shield the sun or the glare of the sky.

In order that a visor perform the above function properly, it is important that such visor turns easily on the shaft in either direction, i.e. up or down, in the process of making a desired adjustment, but stays in the adjusted position without moving down under its own weight, even when the vehicle is driven over rough roads. In the conventional constructions, such operation is attained by the use of a sheet metal piece having a curl formed thereon, which curl somewhat resembles one part of a piano hinge, with the bar passing through such curl. The diameter of the curl is made slightly smaller than that of the bar, and, therefore, when the bar is inserted through the curl, it tends to open the same against resilient resistance thereof whereby the curl, in effect, resiliently grips the bar and offers frictional resistance to its rotation on the bar.

Considerable difficulties have been experienced with such a construction. It was found that when the visor was moved in one direction, it would tend to unwind the curl, thus loosening its grip. Moved in the other direction, the bar would tend to tighten the curl and, therefore, increase frictional resistance of the joint. Thus, frictional resistance of the joint was not the same in the two directions, and securing desirable resistance in the direction of tightening would result in virtually no resistance in the direction of untightening the curl, whereby the visor would tend to move by itself in that direction. Attempts were made to solve this problem by mounting the visor in such a manner that its side of greater resistance would be in the downward direction. However, this solution introduced another difficulty, namely, the necessity of having both right hand and left hand visor assemblies, thus complicating tooling, increasing dealers' inventories and the like.

The second problem was found in the tendency of the free end of the bar to scratch the window should the user forget to fix that end in the pinch bracket. Attempts have been made to eliminate this difficulty by inserting in the end of the curl a bar made of plastic material such as nylon, and having a rounded end. It was found, however, that because of the considerable length of such piece and the extremely hot temperatures to which such piece is subjected in its particular location in a motor vehicle, it often becomes heated to the point of softening and sagging, thus presenting an unsightly appearance and failing to perform properly its intended function.

One of the objects of the present invention is to provide an improved sun visor for motor vehicles whereby the above difficulties and disadvantages are overcome and largely eliminated without introducing other problems or substantially increasing the costs involved.

Another object of the present invention is to provide an improved frictional lock for a motor vehicle visor or similar device which offers equal resistance in both directions.

A further object of the present invention is to provide a frictional lock of the foregoing character which produces a light resilient grip on the visor bar, with such grip being, nevertheless, sufficiently strong to retain the visor in its adjusted position without sagging or moving down under its own weight.

A still further object of the present invention is to provide an improved frictional lock of the above nature offering equal resistance in both directions, thus eliminating the necessity of having both right hand and left hand visor assemblies, which resistance remains substantially uniform through the intended life of the device and does not decrease to the point of insufficiency because of the wear of the rod or of the curl.

A still further object of the present invention is to provide an improved sun visor for motor vehicles, having an improved protective piece for its end.

It is an added object of the present invention to provide an improved visor of the foregoing nature for motor vehicles, which visor is simple in construction, safe and dependable in operation and is relatively inexpensive to manufacture.

Further objects and advantages of this invention will be apparent from the following description and appended claims, reference being had to the accompanying drawings forming a part of this specification, wherein like reference characters designate corresponding parts in the several views.

Figure 1:
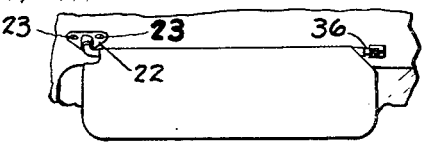
FIG. 1 is an elevational view illustrating generally the sun visor embodying the present invention.
Figure 2:
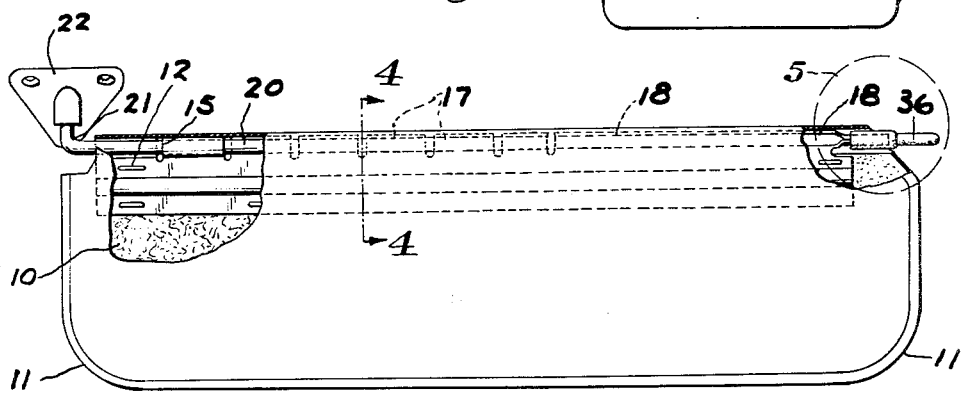
FIG. 2 is a view similar in part to FIG. 1 but showing the sun visor on a larger scale with the parts thereof broken away to show details of its inner construction.

It is to be understood that the invention is not limited in its application to the details of construction and arrangement of parts illustrated in the accompanying drawings, since the invention is capable of other embodiments and of being practiced or carried out in various ways. Also, it is to be understood that the phraselogy and terminology employed herein is for the purpose of description and not of limitation.

In the drawing there is shown, by way of example, a sun visor embodying the present invention. Referring specifically to the drawing, the sun visor illustrated therein comprises a flat body or base piece 10 of suitable material, such as cardboard, of an elongated shape with rounded corners as indicated at 11. To the base piece 10 there is secured in any suitable manner, such as with the aid of staples 12, a sheet metal piece or strip 13 extending substantially throughout the entire length of the base piece 10 and having a bead 14 formed thereon and extending through its entire length for the purposes of imparting requisite rigidity to said sheet metal strip 13.

Figure 3:
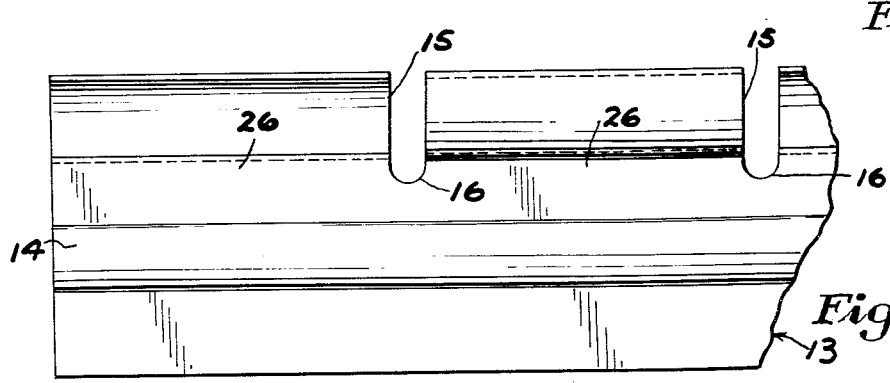
FIG. 3 is a fragmentary elevational view showing an end portion of the sheet metal piece providing a frictional hinge.
Figure 7:
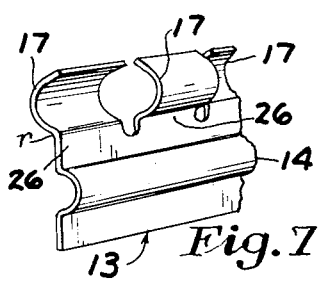
FIG. 7 is a perspective view showing the portion of the sheet metal piece of FIG. 3 in perspective.

Through approximately one-half of the length of the sheet metal strip 13 the upper edge thereof is slitted by the provision of transverse slits 15 having rounded ends, such as 16. By virtue of such a construction a plurality of tongues is thus formed on the upper edge of the strip 13. The tongues or curls 17 are bent to semi-cylindrical shape in alternative directions, as is best shown in FIGS. 3 and 7. It is important to note, however, that such bending is done not through the entire height of the tongues, and that portions thereof separated by the rounded ends of the slits 15 are left straight for the purposes explained in detail later. The right hand portion 18 of the upper edge of the sheet metal piece 13 is bent into a single curl throughout its entire length. By virtue of such a construction there is provided along the upper edge of said sheet metal piece 13 a hinge adapted to receive a bar 20 on which the visor is supported. The end of the bar 20 extending outwardly of the sheet metal piece 13 is bent at a right angle as indicated at 21 and is connected in a manner well known in the art to the bracket 22 secured in any suitable manner, such as with the aid of screws 23 as indicated in FIG. 1, to the interior structure of the vehicle. The base piece and the hinge are covered with a suitable upholstery material, such as imitation leather.

It will now be seen in view of the foregoing that because of substituting for a conventional "full circle" hinge curl, alternating half-curls pointing in opposite directions, I have eliminated the disadvantage of change in the frictional resistance caused by winding and unwinding of the curl by the rod. In my construction, such tendency is eliminated by one half-curl compensating for the tendency of the adjacent half-curl and, therefore, the hinge has equal resistance in both directions of rotation of the visor on the bar. Thus, my improved visor may serve with equal success on either the left or right side of the vehicle.

In accordance with the present invention, improved means are provided whereby the contact between the inner surfaces of the hinge curls and the outside surface of the bar is a full area contact, rather than merely a line contact. By virtue of such an expedient I eliminate the serious disadvantages caused by providing a resilient grip in the curls by forming them to a smaller radius than that of the bar. By a very simple geometric construction it can be shown that both in a full circle curl and in a half-circle curl, spreading such curls by insertion of the bar does not result in changing the radius of the curl uniformly to a larger radius, but causes changing of the outline of the curl from circular to eliptical or a similar shape and, therefore, produces merely a line contact between the curl and the circular hinge bar. Because of such a condition, the resilient grip produced by the curls is greatly affected by wear and is not uniform throughout the life of the device. Such grip may be exceedingly tight in a new device even to the point of causing squeaks; however, it decreases with wear rather rapidly until the sun visor fails to remain in the adjusted position.

Figure 6:
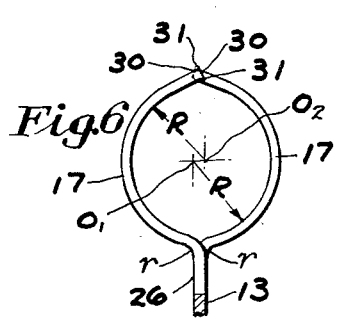
FIG. 6 is a view similar in part to FIG. 4 and showing the hinge in its free condition, i.e. prior to insertion of the bar.

In accordance with the present invention, the half cylindrical curls are originally formed to precisely the same inside diameter as the outside diameter of the hinge bar. Thus, the radii R are equal in FIGS. 4 and 6. However, the adjacent curls are bent over to have their centers or axes $O_1$ and $O_2$ pass or offset from each other as is best shown in FIG. 6. In such a condition, which is the free condition of the curls as formed and before the hinge bar is inserted therethrough, the half-curls appear in the end view of the sheet metal piece 13 to form not a circle but an elongated figure. However, when the bar 20 is passed through the curls, the curls move bodily in the outward direction until their centers or axes $O_1$ and $O_2$ coincide and thus form a perfect circle, as shown in FIG. 4.

In accordance with the invention, the former practice of having rather sharp bends at the places of juncture of the curls with the body of the piece 13 is eliminated, and such bends are made on a certain radius $r$, such as 1/16". Because of such an expedient spreading the half-curls to embrace the hinge bar is effected not by changing the diameter of the curls but by bending the portion of the sheet metal piece 13 in the portions bent at said radius and also by deflecting the portion 26 immediately subjacent to said bend. The latter condition is made possible by extending the slits 15 beyond the lower portions of the curls and producing bendable portions designated in the drawing by the numeral 26.

By virtue of such an expedient the contact between the inner surfaces of the curls and the outer surface of the hinge bar is a full surface contact, and the grip is more resilient, producing relatively little localized wear and, therefore, not materially affected thereby. Thus, the uniformity of frictional resistance of the hinge is maintained over many years of service of the sun visor.

Figure 4:
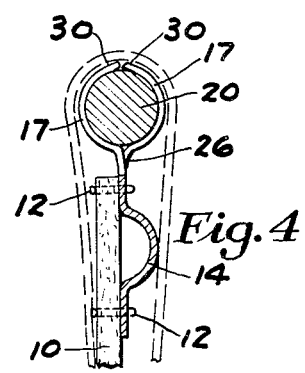
FIG. 4 is a fragmentary sectional view taken in the direction of the arrows on the section plane passing through the section line 4—4 of FIG. 2.

In accordance with the invention the ends 30 of the curls are bent substantially on a tangent as is best shown in FIGS. 4 and 6 in order to space them for a sufficient distance from the outer surface of the bar and thus prevent scraping of the bar by burrs, such as 31, which may be present on the end edges of the curls as a result of stamping operations. This expedient effectively protects the surface of the hinge bar and eliminates difficulties which have been caused in the past as a result of damaging the surface of the hinge bar.

Figure 5:
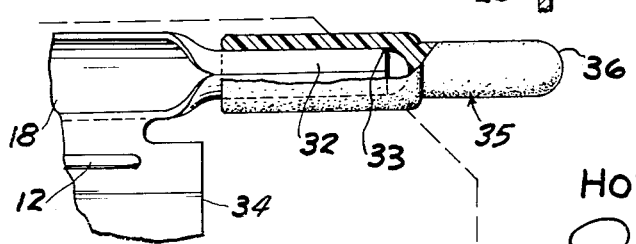
FIG. 5 is a fragmentary elevational view showing on an enlarged scale the portion encircled within the circle 5 in FIG. 2.

In accordance with the invention improved means are provided to prevent the possibility of the end of the visor scratching the glass windshield or the door window should the operator of the vehicle fail to fix such end in the pinch bracket. In accordance with the invention, the end of the continuous curl 18 is extended outwardly beyond the end edge 34 of the piece 13 and is formed to produce a tubular extension 32, as shown in FIG. 5. The circular end edge 33 of the extension 32 is rounded to eliminate any burr or sharp edge at the end of the extension 32.

The extension 32 is adapted to receive a thimble member 35 having a hollow at one of its ends for entry of the extension 32 while its opposite end is made solid and is rounded, as indicated at 36. The entire extent of the thimble member 35 is relatively small being, preferably, only 1¼" or 1½" in length. Because of such size and its disposition wholly outside of the visor construction, such thimble member does not show any tendency to overheat and sag, even if it is made of material such as plastic or other similar materials. Yet, it performs its intended function in a greatly superior manner.

There is thus provided an improved sun visor construction whereby the objects of the present invention and numerous additional advantages are attained.

I claim:

1. In a motor vehicle visor having a substantially flat body, a frictional hinge comprising a rod of circular cross section adapted to be connected to the vehicle structure, a one-piece sheet metal hinge strip disposed on only one side of the visor body and secured to said body at the outside surface thereof along its upper edge, a plurality of curls provided along at least a portion of the upper edge of said strip, each of said curls having curvature corresponding to the diameter of the rod cross section and having one end integral with said strip and the other end free, with each of said curls embracing said rod resiliently to produce frictional resistance to its rotation on the rod with the degree of its resiliency determining such resistance and compensating for the wear of the contacting surface of the curls and of the rod in order to retain such frictional resistance substantially uniform in spite of the wear of said surface in use, with said curls alternating in direction to balance the effect of difference in said frictional resistance in separate curls in the two directions of rotation and thus to produce in the entire hinge uniform resistance in both directions.

2. In a motor vehicle visor having a body, a frictional hinge comprising a rod of circular cross section, a one-piece sheet metal hinge strip having a reinforcing bead running substantially through the entire length thereof adjacent its lower edge at a substantial distance therefrom, said strip being secured to the body of the visor at one of the outside surfaces thereof, and having a plurality of slots provided in a portion of its upper edge, said slots extending transversely of the strip for a substantial distance to form a plurality of tongues with the remaining portion of said upper edge remaining unslitted, said tongues being bent to form a corresponding plurality of curls having free ends engaging said rod resiliently, with said curls alternating in direction to balance the effect of difference in said frictional resistance in separate curls in the two directions of rotation and thus to produce in the entire hinge uniform resistance in both directions, with the unslitted portion of the upper edge being formed into a single reinforcing curl extending from said alternating curls to the end of the strip.

3. The invention defined in claim 2, the extremity of said reinforcing curl at the end of the strip being formed into a tubular extension adapted to receive a protective thimble.

4. In a motor vehicle visor having a body, a frictional hinge comprising a rod of circular cross section, a one-piece sheet metal hinge strip secured to the body of the visor at the outside surface thereof and having one of its edges provided with slits extending transversely of the strip for a substantial distance to form a plurality of tongues, said tongues being bent to form a corresponding plurality of half-cylindrical curls having free ends and alternating in directions, the inside radii of each of said curls being substantially equal on the free condition to the radius of the rod cross section, with said curls in their free state prior to insertion of the rod having their free ends overlapping in the end view to produce resilient grip of the rod when the same is passed through said curls and to grasp the rod substantially with the full surface contact between the curls and the rod.

5. The invention defined in claim 4, with the place of juncture of said curls with the body of the strip having a fillet of a predetermined radius and with said slits extending inwardly of the strip beyond said places of juncture, to provide requisite resilience for opening of the curls by resilient distortion of the material within its elastic limit at said fillets and bending the tongue portions under said curls.

6. The invention defined in claim 4, with the free extremities of said curls extending beyond the confines of the circle of the rod cross section extending away from the circle in order to clear the surface of the rod.

References Cited in the file of this patent

UNITED STATES PATENTS

| | | |
|---|---|---|
| 1,587,144 | Burk | June 1, 1926 |
| 1,599,183 | Phillips | Sept. 7, 1926 |
| 2,137,461 | Rhein | Nov. 22, 1938 |
| 2,340,015 | Pelcher et al. | Jan. 25, 1944 |
| 2,628,125 | Jacobs | Feb. 10, 1953 |

FOREIGN PATENTS

| | | |
|---|---|---|
| 1,125,997 | France | July 23, 1956 |
| 5,082 | Great Britain | Nov. 27, 1890 |